(12) United States Patent
Nakano

(10) Patent No.: US 8,606,462 B2
(45) Date of Patent: Dec. 10, 2013

(54) ELECTRIC POWER STEERING DEVICE

(75) Inventor: Yasuhiro Nakano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 13/063,406

(22) PCT Filed: Sep. 2, 2009

(86) PCT No.: PCT/JP2009/065317
§ 371 (c)(1),
(2), (4) Date: Mar. 10, 2011

(87) PCT Pub. No.: WO2010/029879
PCT Pub. Date: Mar. 18, 2010

(65) Prior Publication Data
US 2011/0166750 A1    Jul. 7, 2011

(30) Foreign Application Priority Data

Sep. 11, 2008 (JP) .................................. 2008-232892

(51) Int. Cl.
*B62D 5/04* (2006.01)
(52) U.S. Cl.
USPC ............................................................ 701/41
(58) Field of Classification Search
USPC ............................................................ 701/41
See application file for complete search history.

(56) References Cited

U.S. PATENT DOCUMENTS

| | | | | |
|---|---|---|---|---|
| 5,482,129 A | * | 1/1996 | Shimizu | 180/446 |
| 5,596,252 A | * | 1/1997 | Shimizu et al. | 318/432 |
| 5,631,529 A | * | 5/1997 | Shimizu et al. | 318/432 |
| 5,788,010 A | * | 8/1998 | Mukai et al. | 180/446 |
| 5,979,587 A | * | 11/1999 | Liubakka et al. | 180/446 |

(Continued)

FOREIGN PATENT DOCUMENTS

| | | |
|---|---|---|
| JP | 7-308088 A | 11/1995 |
| JP | 7-308089 A | 11/1995 |

(Continued)

OTHER PUBLICATIONS

Supplementary European Search Report from EP App No. 09813025.5 dated on Dec. 1, 2011.

*Primary Examiner* — Thomas Tarcza
*Assistant Examiner* — Alex C Dunn
(74) *Attorney, Agent, or Firm* — Arent Fox LLP

(57) ABSTRACT

There is provided a electric power steering device which can perform torque control through a simple arithmetic process using a synchronous reluctance motor having a nonlinear current/torque characteristic. A target torque is transmitted from an EPS control unit 41 to a motor control unit 51. The motor control unit 51 calculates a target-current effective value I and a target-current phase θ from the input target torque. Based on the calculated target-current effective value I and target-current phase θ, calculation is changed whether to perform calculation so that the maximum torque (the maximum torque obtainable at the minimum current effective value) can be obtained, or to perform calculation so that the maximum output (the maximum output obtainable at the minimum current effective value) can be obtained in accordance with a duty ratio of an output by a PWM converting unit 57 comprising a three-phase inverter. Next, a three-phase biaxial converting unit 53 calculates a target q-axis current Iq and a target d-axis current Id from the target-current effective value I and the target-current phase θ, and the PWM converting unit 57 performs duty control in order to control the torque of a motor 58.

2 Claims, 7 Drawing Sheets

(56) References Cited

U.S. PATENT DOCUMENTS

| | | | |
|---|---|---|---|
| 6,054,827 A * | 4/2000 | Takatsuka et al. | 318/474 |
| 6,112,846 A * | 9/2000 | Mukai et al. | 180/446 |
| 6,129,172 A * | 10/2000 | Yoshida et al. | 180/446 |
| 6,246,197 B1 * | 6/2001 | Kurishige et al. | 318/432 |
| 6,250,418 B1 | 6/2001 | Shimizu et al. | |
| 6,725,965 B2 * | 4/2004 | Kogiso et al. | 180/446 |
| 6,876,910 B2 * | 4/2005 | Kifuku | 701/41 |
| 7,860,624 B2 * | 12/2010 | Kubota et al. | 701/41 |
| 7,889,978 B2 * | 2/2011 | Ueda et al. | 388/812 |
| 2004/0100221 A1 | 5/2004 | Fu | |
| 2008/0129243 A1 | 6/2008 | Nashiki | |
| 2008/0191655 A1 * | 8/2008 | Ueda et al. | 318/609 |

FOREIGN PATENT DOCUMENTS

| | | |
|---|---|---|
| JP | 11-334630 A | 12/1999 |
| JP | 2001-018822 A | 1/2001 |
| JP | 3209853 B2 | 9/2001 |
| JP | 3209854 B2 | 9/2001 |
| JP | 2002-281794 A | 9/2002 |
| JP | 2002-360000 | 12/2002 |
| JP | 2005-151665 A | 6/2005 |
| JP | 2006-121821 A | 5/2006 |
| JP | 2007-151336 A | 6/2007 |
| JP | 2008-114612 A | 5/2008 |
| JP | 2008-141835 A | 6/2008 |

* cited by examiner

ELECTRIC POWER STEERING DEVICE

BACKGROUND OF THE INVENTION

1. Field of the Invention

The present invention relates to a electric power steering device which controls a motor torque on the basis of a steering-torque signal and a speed signal in order to assist a steering, and more particularly, relates to the electric power steering device which assists a steering with a synchronous reluctance motor.

2. Description of the Related Art

A electric power steering device is a steering-force supporting device to reduce a steering force generated by a steering operation by a driver by causing an electric motor (a motor) to generate an auxiliary torque in accordance with the largeness of a steering torque of a vehicle and to transmit the auxiliary torque to a steering system. An example of such a motor used in the electric power steering device is a synchronous reluctance motor. The synchronous reluctance motor makes a rotary operation by a reluctance torque generated at a steel-plate layer of a rotator having no magnet, and in general, has a structure in which a stator has a three-phase windings, and the rotor has grooves of air (air layers) that are referred to as flux barriers provided inside the steel-plate layer. Such a structure enables the synchronous reluctance motor to generate a rotating torque (hereinafter, simply referred to as a torque) without needing an expensive rare-earth magnet or the like, resulting in a cost reduction, and good recyclability.

Also, unlike a general brushless motor having a linear torque-current characteristic, the synchronous reluctance motor has a nonlinear torque-current characteristic and calculates a target current and a current advance angle (the advancing phase angle of an armature current relative to an induced voltage) using a target torque and a motor revolutionary speed. At this time, regarding the current advance angle, an advance-angle correction value is obtained with the absolute value of the target torque being divided into three points (i.e., a region (T<T1) where the absolute value of the target torque (T) is smaller than a target torque (T1) at the maximum revolutionary speed, a region (T1<T<T3) where the absolute value of the target torque (T) is present between the foregoing target torque and a target torque (T3) that is a midpoint between a nonlinear curve of the torque-current characteristic and a linear curve thereof, and a region (T3<T) where the absolute value of the target value (T) is larger than T3), and is calculated for each revolutionary speed. The calculated target current is output in a current form of a three-phase current or a d-axis current/q-axis current.

A technology that controls a torque of the synchronous reluctance motor through such a method is disclosed in, for example, patent literature 1 and patent literature 2. The technology disclosed in these patent literatures intends to perform torque control from a low-output torque to a high-output torque by detecting the position of the rotator and the speed thereof in order to obtain a torque instruction even though the torque-current characteristic of the synchronous reluctance motor is nonlinear. In patent literature 1, an advance-angle correction value (AX) is calculated with the absolute value of a difference between a maximum revolutionary speed (N3) and a present revolutionary speed (N) being as a part of an input. Also, in patent literature 2, the advance-angle correction value (AX) is calculated from an output of a function (ADC) having the present revolutionary speed (N) as an input. That is, AX=ADC×N.

Patent Literature 1: Japan Patent No. 3209853
Patent Literature 2: Japan Patent No. 3209854

However, in the case of prior arts, conditions for obtaining the target current and the current advance angle are complicated, so that an arithmetic process time for controlling the torque of the synchronous reluctance motor becomes long, a processing capability of a CPU necessary for the arithmetic process and a memory capacity become large. Also, in the synchronous reluctance motor, the largeness of a torque and the revolutionary speed of the torque which can be output varies depending on the state of a power-source voltage, however, the technologies disclosed in both patent literatures 1 and 2 leave the variation of a power-source voltage out of consideration. Therefore, it is difficult to apply the technologies disclosed in both patent literatures 1 and 2 to the electric power steering device that uses a battery voltage because those technologies.

The present invention is made in view of these problems, and it is an object of the present invention to provide a electric power steering device that can perform good torque control through a simple arithmetic process using a synchronous reluctance motor having a nonlinear torque-current characteristic.

SUMMARY OF THE INVENTION

In order to overcome the foregoing problem, a first aspect of the present invention provides an electric power steering device employing a configuration in which the electric power steering device drives a synchronous reluctance motor based on a steering input signal from a steering input detecting unit and assists a steering, in which the electric power steering device comprises: a target-torque calculating unit that calculates a target torque output by the synchronous reluctance motor based on at least a steering input signal; and a target-current calculating unit that calculates a target current to the synchronous reluctance motor based on a signal from the target-torque calculating unit, in which the target-current calculating unit calculates a motor-current effective value and a motor-current phase which are necessary for generating a target torque value and the synchronous reluctance motor is driven by calculating a d-axis current and a q-axis current based on the motor-current effective value and the motor-current phase.

According to this configuration, a motor-current effective value (a target-current effective value) I and a motor-current phase (a target-current phase) θ are calculated from a target torque, and a d-axis current and a q-axis current are calculated based on the target-current effective value I and the target-current phase θ in order to drive/control the synchronous reluctance motor. Accordingly, good torque control is enabled even though the synchronous reluctance motor has a nonlinear torque-current characteristic. In other words, when the synchronous reluctance motor is subjected to target torque control, it is possible to optimize a motor current in order to perform the torque control.

Also, a second aspect of the present invention provides the electric power steering device of the first aspect of the present invention, in which the target-current calculating unit includes a map for calculating the motor-current effective value and the motor-current phase θ from the input target torque value, and the map includes at least two maps which are a normal range map and a high-output range map.

According to this configuration, because the target-current calculating unit has the normal range map (a maximum torque map) and the high-output range map (a maximum output map), it is possible to uniquely obtain the target-current effective value I and the target-current phase θ when the target torque is input to the target-current calculating unit.

Also, a third aspect of the present invention provides the electric power steering device of the second aspect of the present invention, in which the map is changed from the normal range map to the high-output range map when a duty ratio of driving power output to the synchronous reluctance motor is equal to or larger than a predetermined value.

According to this configuration, when the duty ratio becomes equal to or larger than the predetermined value (e.g., when the duty ratio becomes equal to or larger than 80%), the change of the map from the normal range map to the high-output range map is enabled. Also, when the duty ratio becomes equal to or less than the predetermined value (e.g., when the duty ratio becomes equal to or less than 70% in consideration of hysteresis), it may be configured so that the map is changed from the high-output range map to the normal range map.

According to the present invention, it becomes possible to provide a electric power steering device that can perform good torque control through a simple arithmetic process using a synchronous reluctance motor having a nonlinear torque-current characteristic.

DETAILED DESCRIPTION OF THE PREFERRED EMBODIMENT

An embodiment of a electric power steering device using a synchronous reluctance motor according to the present invention will be explained below in detail with reference to the accompanying drawings.

<Electric Power Steering Device 1>

Figure 1:
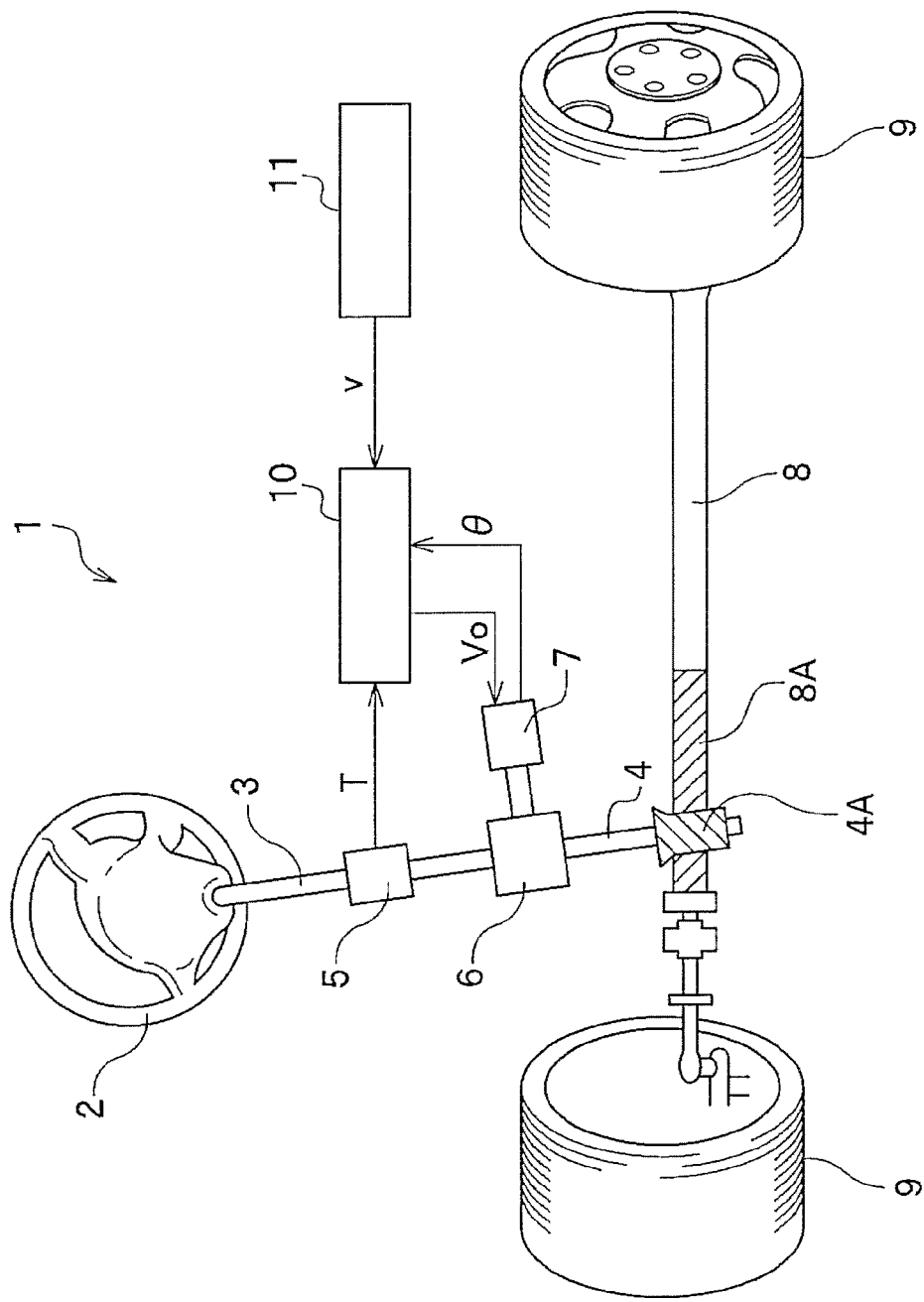
FIG. 1 is an overall configuration diagram of a electric power steering device including a synchronous reluctance motor according to an embodiment of the present invention.

FIG. 1 is an overall configuration diagram of a electric power steering device 1 including a synchronous reluctance motor according to an embodiment of the present invention.

As shown in FIG. 1, the electric power steering device 1 includes a steering wheel 2, and the steering wheel 2 is joined with a pinion shaft 4 through a steering shaft 3. A steering torque generated by the operation of the steering wheel 2 given by a driver is transmitted to the pinion shaft 4 through the steering shaft 3. The pinion shaft 4 is provided with a magnetostrictive torque sensor 5 which detects the steering torque that acts on a steering system and a torque transmitting unit 6, and the torque transmitting unit 6 is coupled to an electric machinery (electric motor) 7 that applies an auxiliary torque to the steering system. As the electric motor 7, a synchronous reluctance motor is used. Also, the torque sensor 5 may be other torque detecting elements in other forms like an optical torque sensor in addition to a magnetostrictive sensor.

The electric power steering device 1 employs a so-called rack-and-pinion configuration, a pinion 4A provided at the lower end of the pinion shaft 4 meshes with a rack tooth 8A formed around a rack shaft 8, and the rotation of the pinion shaft 4 is converted into a displacement in the axial direction of the rack shaft 8, so that wheels to be steered 9, 9 are steered. Also, the torque sensor 5 outputs a steering-torque signal T to a control device 10. The control device 10 calculates an auxiliary torque on the basis of the steering-torque signal T output by the torque sensor 5 and a vehicle speed signal v output by a speed sensor 11 and controls the electric motor 7 by outputting a three-phase electric motor driving voltage V0 to the electric motor 7.

Also, it is not illustrated in detail in the figure but the torque transmitting unit 6 is configured to rotate the pinion shaft 4 through a worm gear (not shown) with the rotating torque by the electric motor 7. It is configured that the auxiliary torque by the electric motor 7 is transmitted through the torque transmitting unit 6 to the pinion shaft 4, and is further transmitted to the steering system from the rack shaft 8 through the pinion 4A and the rack tooth 8A, and the wheel to be steered 9 is steered. Note that FIG. 1 shows the major part of the steering system.

According to such a configuration, when the driver steers the miming direction of a vehicle by operating the steering wheel 2 while the vehicle is running, a rotative force generated based on the steering torque which is applied to the steering shaft 3 is converted into a straight motion of the rack shaft 8 in the axial direction from the pinion 4A through the rack tooth 8A, and causes the running direction of the steering wheels to be steered 9, 9 to be changed. At this time, the torque sensor 5 attached to the steering shaft 3 simultaneously detects the steering torque corresponding to the steering operation of the steering wheel 2 given by the driver, converts the detected torque to the electrical steering-torque signal T, and outputs the steering-torque signal T to the control device 10. Also, the speed sensor 11 detects the vehicle speed signal v, and outputs such a signal to the control device 10.

The control device 10 generates the electric motor driving voltage V0 for driving the electric motor 7 on the basis of a target signal based on the steering-torque signal T and the speed signal v and of an angular signal θ indicating the rotation angle of the electric motor 7. At this time, the control device 10 performs dq-vector conversion which decomposes the electric motor driving voltage V0 to a d-axis (a magnetic flux axis) and a q-axis (a torque axis) that is electrically orthogonal to the d-axis at a right angle and which controls the electric motor driving voltage using an electric-motor current I0 and an angular signal θ0. The electric motor 7 is rotated and driven based on the three-phase electric motor driving voltage V0 of U, V, and W phases, and a three-phase alternating current IAC (Iu, Iv, and Iw) flows through.

Accordingly, an auxiliary steering force based on the rotating torque of the electric motor 7 acts on the pinion shaft 4 joined with the steering shaft 3 through the torque transmitting unit 6, and is transmitted to the rack shaft 8 by the rack-and-pinion configuration. As explained above, by driving the electric motor 7, the steering force applied to the steering wheel 2 by the driver is reduced.

<Configuration and Operation of Synchronous Reluctance Motor 35>

Next, the general configuration and operation of a synchronous reluctance motor 35 used as the electric motor 7 of the electric power steering device 1 shown in FIG. 1 will be explained.

Figure 2:
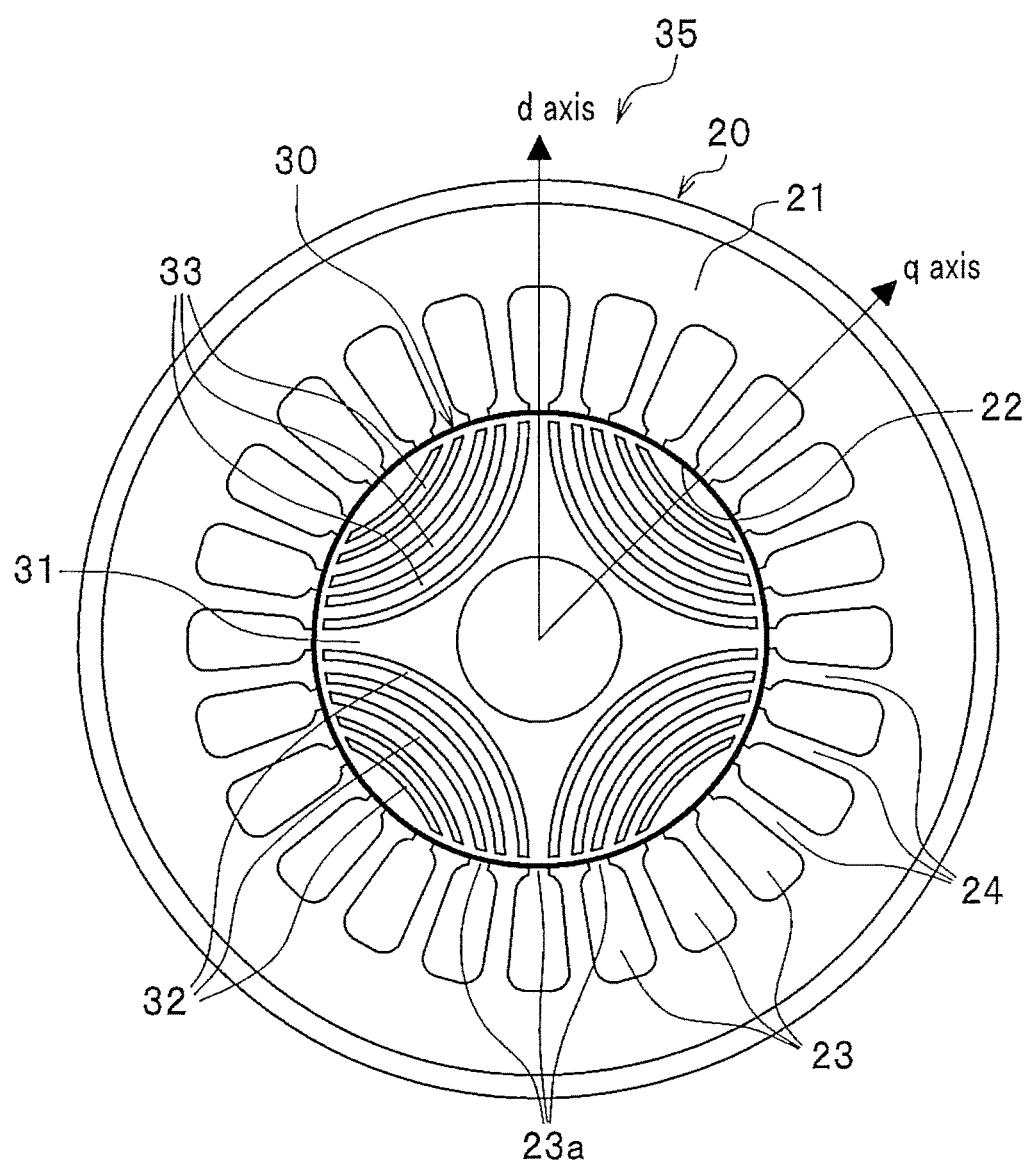
FIG. 2 is a cross-sectional view of a general synchronous reluctance motor.

FIG. 2 is a cross-sectional view of the general synchronous reluctance motor 35. The synchronous reluctance motor 35 is provided with a rotator 30 having four magnetic poles (a pair of binary poles) and a stator 20 having 24 slots 23.

The stator 20 of the synchronous reluctance motor 35 is provided with a stator main body 21, and the plural slots 23 and T-shaped teeth 24 formed on an inner circumference surface 22 of the stator main body 21. Also, the rotator 30 is provided with plural linear flux barriers (air layers) 32 each formed to a predetermined width and length relative to a rotator main body 31, and plural steel-plate ribs (ribs) 33 are formed. Both ends of each steel-plate rib (rib) 33 are provided at the outer circumference of the rotator 30. The rotator main body 31 is comprised of a magnetic material like an electromagnetic steel plate. The plural flux barriers 32 may be formed of a nonmagnetic material like a resin in addition to the form of the air layers. The plural flux barriers 32 are arranged radially around the q-axis (the torque axis) that is mechanically inclined at 45 degree with the d-axis (the magnetic flux axis) being as a border. Accordingly, four pairs of the flux barrier 32 and the steel-plate rib 33 arranged around the q-axis are radially provided. Also, the d-axis is orthogonal to a rotator axis, and is consistent with the axis of the steel-plate rib 33 at the both ends of the steel-plate rib 33.

The operation of the synchronous reluctance motor 35 configured as explained above will be explained. First, when the three-phase alternating current is caused to flow through a wound coil (not shown) wound around the slots 23 of the stator 20, a magnetic field is generated at the tooth 24, and a magnetic flux returns to another tooth 24 through the rotator 30. Because the plural flux barriers 32 are provided inside the rotator main body 31, there are a direction (the d-axis direction) through which the magnetic flux easily passes and a direction (the q-axis direction) through which the magnetic flux does not easily pass. The difference between a d-axis magnetic flux and a q-axis magnetic flux (a magnetic reluctance difference) generates a reluctance torque, so that the rotator 30 rotates in a predetermined direction.

At this time, the flux barriers 32 and the steel-plate ribs 33 facing the teeth 24 have a little change in the magnetic flux even if the rotator 30 rotates, and does not become a cause of generating a torque ripple. However, when the rotator 30 rotates, the torque ripple is generated because of a mutual positional relationship between a minute slot aperture 23a formed between the adjoining teeth 24 and the flux barrier 32 (or the steel-plate rib 33). That is, the magnetic flux changes when the slot aperture 23a of the stator 20 faces the steel-plate rib 33 of the rotator 30 or when the slot aperture 23a of the stator 20 faces the flux barrier 32 of the rotator 30, so that the change in the mutual position between the stator 20 and the rotator 30 (i.e., by a rotation of the rotator 30) generates the torque ripple in the rotating torque by the rotator 30. Accordingly, a conventionally well-known technology that suppresses a generation of the torque ripple may be employed by changing the shape of the flux barriers 32.

<Motor Control System 40>

Next, a motor control system 40 of the electric power steering device 1 using the synchronous reluctance motor according to the embodiment will be explained.

Figure 3:
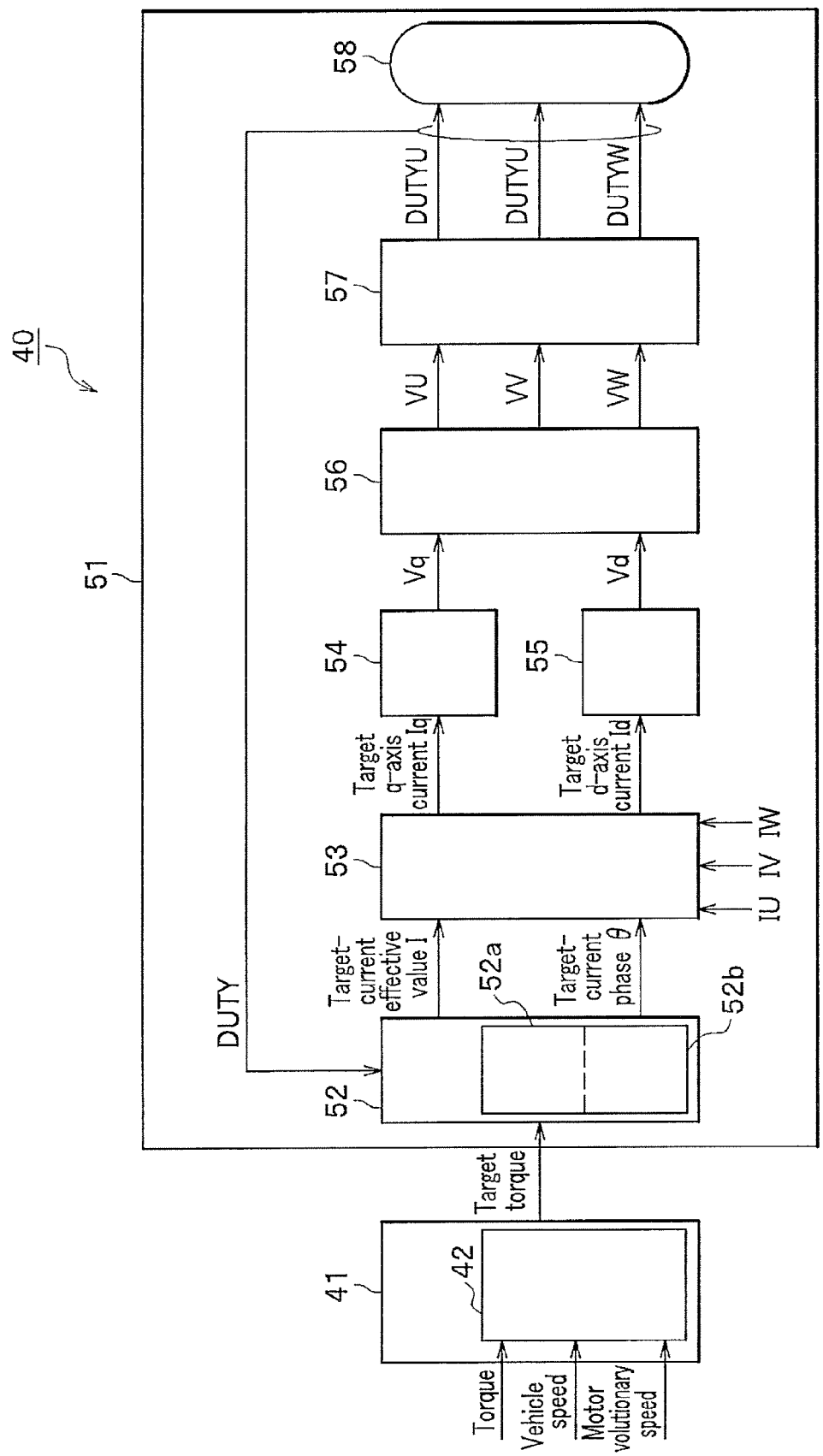
FIG. 3 is a block diagram showing a configuration of a motor control system of the electric power steering device using the synchronous reluctance motor according to the embodiment of the present invention.

FIG. 3 is a block diagram showing the configuration of the motor control system 40 of the electric power steering device 1 using the synchronous reluctance motor according to the embodiment of the present invention. The function of the motor control system 40 is realized by a computer having a CPU, a RAM, an I/O, and the like and a predetermined program installed in that computer.

The motor control system 40 shown in FIG. 3 comprises an EPS (a motor-driven power steering) control unit 41 and a motor control unit 51. The EPS control unit 41 includes a target-torque calculating unit 42. The motor control unit 51 includes a target-current calculating unit 52, a three-phase biaxial converting unit 53, a q-axis (the torque axis) PI control unit 54, a d-axis (the magnetic flux axis) PI control unit 55, a biaxial three-phase converting unit 56, a PWM converting unit 57, and a motor (the synchronous reluctance motor) 58. The target-current calculating unit 52 includes a maximum torque map (a normal range map) 52a and a maximum output map (a high-output range map) 52b.

The target-torque calculating unit 42 of the EPS control unit 41 receives inputting of a torque sensor signal, a vehicle speed, and the revolutionary speed of the motor (the synchronous reluctance motor) 58, calculates a target torque to be output by the motor 58, and outputs the target torque to the target-current calculating unit 52 of the motor control unit 51. That is, a target value transmitted from the EPS control unit 41 to the motor control unit 51 is the value of the target torque.

Also, the target-current calculating unit 52 in the motor control unit 51 calculates a target-current effective value I and a target-current phase θ from the input target torque. The target-current effective value I and the target-current phase θ are calculated in such a way that (a) the motor 58 can output a maximum torque T (a maximum torque obtainable at a minimum current effective value) or (b) the motor 58 can output a maximum output W (a maximum output obtainable at the minimum current effective value). The maximum output W means W (watt)=T×N. However, N is the revolutionary speed of the motor 58. The target-current calculating unit 52 changes over the conditions in which (a) the maximum torque T is set as the target value or (b) the maximum output W is set as the target value in accordance with the level of the duty (DUTY) ratio of a signal (a driving current) output by the PWM converting unit 57 comprising a three-phase inverter as will be discussed later.

The method of calculating a target current by the target-current calculating unit 52 is realized by calculating a target three-phase current or a target d-axis current/target q-axis current and by giving these currents back to a current feedback system so as to obtain a target torque. That is, because a motor control controls a current that flows through the motor 58, so that the target three-phase current or the target d-axis current/target q-axis current is calculated from the target torque in order to perform the motor control.

More specifically, the target-current calculating unit 52 has the maximum torque map (the normal range map) 52a and the maximum output map (the high-output range map) 52b, changes over these maps and uses any one of these maps, and calculates the target current from the target torque. Changing of the maximum torque map 52a for obtaining the target value of the maximum torque T and the maximum output map 52b for obtaining the target value of the maximum output W is performed on the basis of the level of the duty ratio output by the PWM converting unit 57 comprising a three-phase inverter. That is, when the duty ratio output by the PWM converting unit 57 is less than a predetermined value, the map is changed to the maximum torque map 52a, and when that duty ratio is equal to or larger than the predetermined value, the map is changed to the maximum output map 52b. In this fashion, the target-current effective value I and the target-current phase θ which are calculated by the target-current calculating unit 52 from the target torque are output to the three-phase biaxial converting unit 53.

The three-phase biaxial converting unit 53 inputs the target-current effective value I and the target-current phase θ and converts the three phase currents IU, IV, and IW to a biaxial current (a dq-axes current) including a current of d-axis (the target d-axis current Id) that is the magnetic flux axis (an excitation axis) of the rotator of the motor 58 and a current of q-axis (the target q-axis current Iq) that is an axis electrically rotated by 90 degrees from the d-axis. The value of the target q-axis current Iq is proportional to a generated torque TM of the motor 58, and the value of the target d-axis current Id is proportional to an excitation current. Also, "an angle advancement" can be performed by changing the target d-axis current Id and the target q-axis current Iq as needed. That is, by controlling the target d-axis current Id and the target q-axis current Iq, a control corresponding to the field weakening control of a brushless motor is performed. In this fashion, a steering feeling is improved by controlling the target torque while achieving an effect corresponding to that of the field weakening control.

The q-axis (the torque axis) PI control unit 54 to which the target q-axis current Iq is input generates a q-axis voltage Vq by performing P (proportion) control and I (integral) control so as to reduce a deviation signal, and outputs the q-axis voltage Vq to the biaxial three-phase converting unit 56. Also, the d-axis (the magnetic flux axis) PI control unit 55 to which the target d-axis current Id is input generates a d-axis voltage Vd by performing the PI control so as to reduce output signals by an adder (not shown), and outputs the d-axis voltage Vd to the biaxial three-phase converting unit 56.

The biaxial three-phase converting unit 56 converts a biaxial signal including an output signal Vq by the q-axis (the torque axis) PI control unit 54 and an output signal Vd by the d-axis (the magnetic flux axis) PI control unit 55 to three-phase signals VU, VV, and VW. The PWM converting unit 57 generates DUTY signals (DUTY U, DUTY V, and DUTY W) which are ON/OFF signals (PWM (Pulse Width Modulation) signals) having a pulse width that is proportional to the levels of respective input three-phase signals VU, VV, and VW, and outputs the generated signal to the motor 58. An angular signal θ of the motor 58 is input to the biaxial three-phase converting unit 56 and the PWM converting unit 57, and signals are output at a timing in accordance with the position of the magnetic pole of the rotator 30 (see FIG. 2).

Next, the operation of the major part according to this embodiment of the present invention will be explained with reference to FIG. 3.

First, the target-torque calculating unit 42 of the EPS control unit 41 calculates the target torque to be output by the motor (the synchronous reluctance motor) 58 on the basis of steering input signals (i.e., a torque sensor signal, a vehicle speed signal, and a motor revolutionary speed signal) input by an unillustrated steering input detecting unit, and outputs the target torque to the target-current calculating unit 52 of the motor control unit 51.

This causes the target-current calculating unit to calculate a motor-current effective value (the target-current effective value) I and motor-current phase (the target-current phase) θ which are necessary for generating the input target torque value, and outputs the target-current effective value I and the target-current phase θ to the three-phase biaxial converting unit 53. The three-phase biaxial converting unit 53 calculates the target q-axis current Iq and the target d-axis current on the basis of the target-current effective value I and the target-current phase θ, so that the PWM converting unit 57 performs PWM control to drive the motor (the synchronous reluctance motor) 58 on the basis of the target q-axis current Iq and the target d-axis current.

The target-current calculating unit 52 of the motor control unit 51 has two maps for calculating the motor-current effective value (the target-current effective value) I and the motor-current phase (the target-current phase) θ from the input target torque value. That is, the target-current calculating unit 52 has the maximum torque map 52a that is the normal range map and the maximum output map 52b that is the high-output range map.

When the duty ratio of driving power output by the PWM converting unit 57 to the motor (the synchronous reluctance motor) 58 becomes equal to or larger than a predetermined value, the map is changed from the normal range map (the maximum torque map 52a) to the high-output range map (the maximum output map 52b), and when the duty ratio becomes equal to or less than the predetermined value, the map is changed from the high-output range map (the maximum output map 52b) to the normal range map (the maximum torque map 52a).

When the duty ratio becomes, for example, equal to or larger than 80%, the map is changed from the normal range map (the maximum torque map 52a) to the high-output range map (the maximum output map 52b). Also, when the duty ratio decreases to equal to or less than 70%, the map is changed from the high-output map (the maximum output map 52b) to the normal range map (the maximum torque map 52a). The reason why a reference value (70%) for changing the map from the high-output range map (the maximum output map 52b) to the normal range map (the maximum torque map 52a) when the duty ratio decreases is set to be less than a reference value (80%) for changing the map from the normal range map (the maximum torque map 52a) to the high-output range map (the maximum output map 52b) when the duty ratio rises is to have hysteresis characteristics and to avoid an unintended map changing which may be affected by noises or the like in the vicinity of the boundary value to be the reference for map changing.

Figure 4:
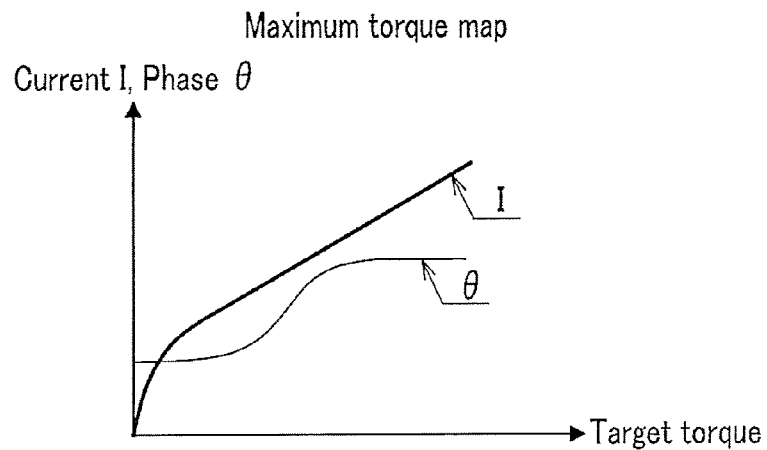
FIG. 4 is a characteristic diagram of a maximum torque map of a target-current calculating unit shown in FIG. 3.

FIG. 4 is a characteristic diagram of the maximum torque map 52a of the target-current calculating unit 52 shown in FIG. 3, the horizontal axis thereof indicates the target torque and the vertical axis thereof indicates the target-current effective value I and the target-current phase θ. Also, FIG. 5 is a characteristic diagram of the maximum output map 52b of the target-current calculating unit 52 shown in FIG. 3, the horizontal axis thereof indicates the target torque and the vertical axis thereof indicates the target-current effective value I and the target-current phase θ.

Figure 5:
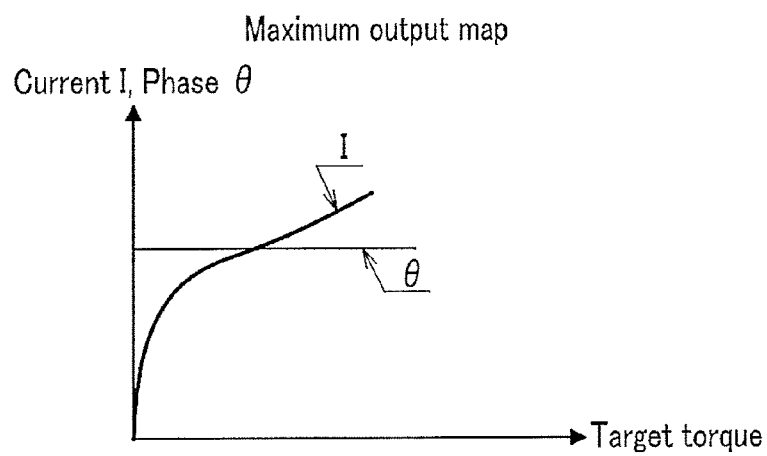
FIG. 5 is a characteristic diagram of the maximum output map of the target-current calculating unit shown in FIG. 3.

Because the target-current calculating unit 52 has the maximum torque map 52a (the normal range map) shown in FIG. 4 and the maximum output map 52b (the high-output range map) shown in FIG. 5, it is possible to uniquely obtain the target-current effective value I and the target-current phase θ in accordance with the input target torque value without an approximate value operation with a high-order function.

The maximum output of the motor 58 can be increased when the high-output range map (the maximum output map 52b) is used in comparison with the case when the normal range map (the maximum torque map 52a) is used. That is, when the high-output range map (the maximum output map 52b) is used, the maximum output W can be increased based on a relationship W-=T×N because a revolutionary speed N of the motor 58 can be increased at the same torque T as that of the normal range map (the maximum torque map 52a).

Figure 6:
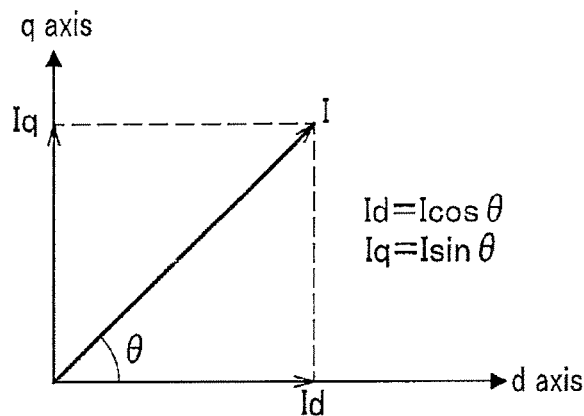
FIG. 6 is a characteristic diagram of a three-phase biaxial converting unit shown in FIG. 3 which obtains a q-axis current and a d-axis current from a target-current effective value and a target-current phase.

FIG. 6 is a characteristic diagram of the three-phase biaxial converting unit 53 shown in FIG. 3 which obtains the q-axis current Iq and the d-axis current Id from the target-current effective value I and the target-current phase B.

When the target-current calculating unit 52 obtains the target-current effective value I and the target-current phase θ from the target torque through the maximum torque map shown in FIG. 4 or the maximum output map shown in FIG. 5, the three-phase biaxial converting unit 53 obtains, as shown in the characteristic diagram of FIG. 6, the q-axis current Iq and the d-axis current Id from the target-current effective value I and the target-current phase θ for each maximum torque map or maximum output map. That is, if the target-current effective value I and the target-current phase θ are known beforehand, the q-axis current Iq can be obtained from Iq=I sin θ, and the d-axis current Id can be obtained from Id=I cos θ. PWM control is performed after biaxial three-phase conversion is performed on the basis of the q-axis current Iq and the d-axis current Id which are obtained in this manner, and thus the motor 58 is controlled.

Figure 7:
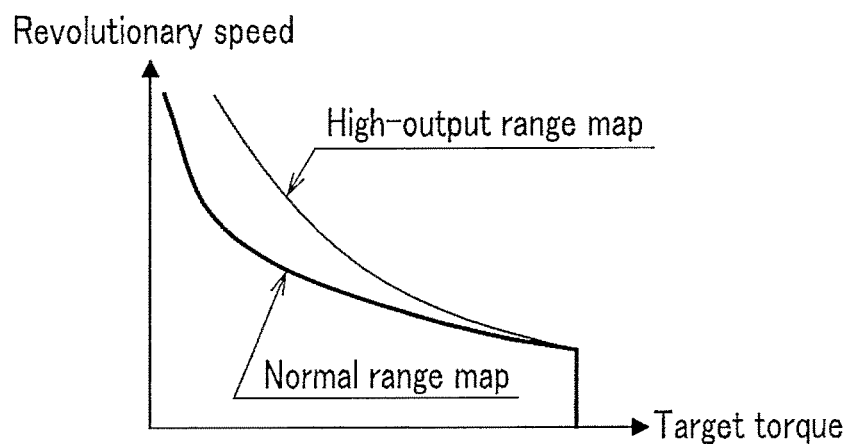
FIG. 7 shows a torque-revolutionary speed characteristic of a high-output range map and a normal range map.
Figure 8:
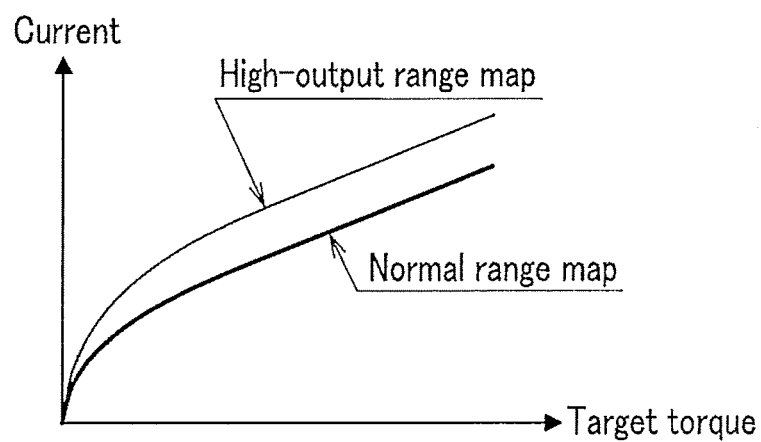
FIG. 8 shows a torque-current characteristic of a high-output range map and a normal range map.

FIG. 7 shows the torque-revolutionary speed characteristic of the high-output range map and the normal range map, the horizontal axis thereof indicates the target torque and the vertical axis thereof indicates the revolutionary speed. Also, FIG. 8 shows the torque-current characteristic of the high-output range map and the normal range map, the horizontal axis thereof indicates the target torque and the vertical axis thereof indicates the current.

As shown in FIG. 7, when the high-output range map is used, at the same target torque T as that of the normal range map, the maximum output W can be increased because the revolutionary speed N of the motor 58 becomes fast. However, as shown in FIG. 8, because a current necessary for obtaining the same torque T becomes larger than that of the normal range map, when a high revolution is unnecessary, the map is changed to the normal range map having a less current consumption. In this fashion, by changing over the map between the normal range map and the high-output range map as needed, a sufficient maximum output can be obtained depending on the steering condition, while at the same time, the current consumption is suppressed.

As explained above, the motor control system 40 using the synchronous reluctance motor of this embodiment sets, as the target torque, the target value transmitted from the EPS control unit 41 to the motor control unit 51, and the motor control unit 51 calculates the target-current effective value I and the target-current phase θ from the input target torque. Based on the calculated target-current effective value I and target-current phase θ, changing over of calculation whether to perform calculation so that the maximum torque (the maximum torque obtainable at the minimum current effective value) or to perform calculation so that the maximum output (the maximum output obtainable at the minimum current effective value) is executed in accordance with the duty ratio of the output by the PWM converting unit 57 comprising the three-phase inverter.

According to the electric power steering device 1 using the synchronous reluctance motor of this embodiment, when the target-current effective value I and the target-current phase θ are calculated from the target torque input from the EPS control unit 41 to the motor control unit 51, calculation is changed whether to perform calculation so that the maximum torque is obtained and to perform calculation so that the maximum output is obtained depending on the duty ratio of the output by the three-phase inverter. This enables torque control with a relatively linear characteristic even though the synchronous reluctance motor having the nonlinear torque-current characteristic is used through a simple calculation.

Also, according to the electric power steering device 1 of this embodiment, the controllability (the linearity of the torque-current characteristic) of the electric power steering device is further improved by controlling the synchronous reluctance motor with the target torque. Also, when a power assist through a high output by the motor is required when the steering is continuously turned or at the time of a static steering, etc., the torque control is performed by changing the map between the normal range map and the high-output range map accordingly, so that an output shortage is not likely to occur and a proper power assist is enabled. That is, because the synchronous reluctance motor can control the d-axis current corresponding the field weakening control of a general brushless motor, it becomes possible to control the motor most appropriately and to perform power assist even though the current/torque characteristic is nonlinear. In other words, because the synchronous reluctance motor of this embodiment performs angle advancement correction on the target torque as a control corresponding to the field weakening control of the general brushless motor, the more proper torque control is enabled.

Also, according to the electric power steering device 1 of this embodiment, it becomes possible to independently design the EPS control unit 41 and the motor control unit 51 by minimizing the effect of the motor parameter (a torque constant kt) of the synchronous reluctance motor. In other words, by changing the motor parameter to be input from the EPS control unit 41 to the motor control unit 51 from the target current to the target torque, it becomes possible to independently design the EPS control unit 41 and the motor control unit 51. Consequently, the labor hour of the designing of the electric power steering device can be reduced. However, a condition must be satisfied in which no actual torque responds to the target torque output by the EPS control unit 41 until the next period of the EPS control. That is, the condition must be satisfied in which the frequency characteristic of the motor control unit 51 is better than that of the EPS control unit 41.

<Comparative Example>

Next, as a comparative example, a motor control system of the electric power steering device using a general brushless motor will be explained.

Figure 9:
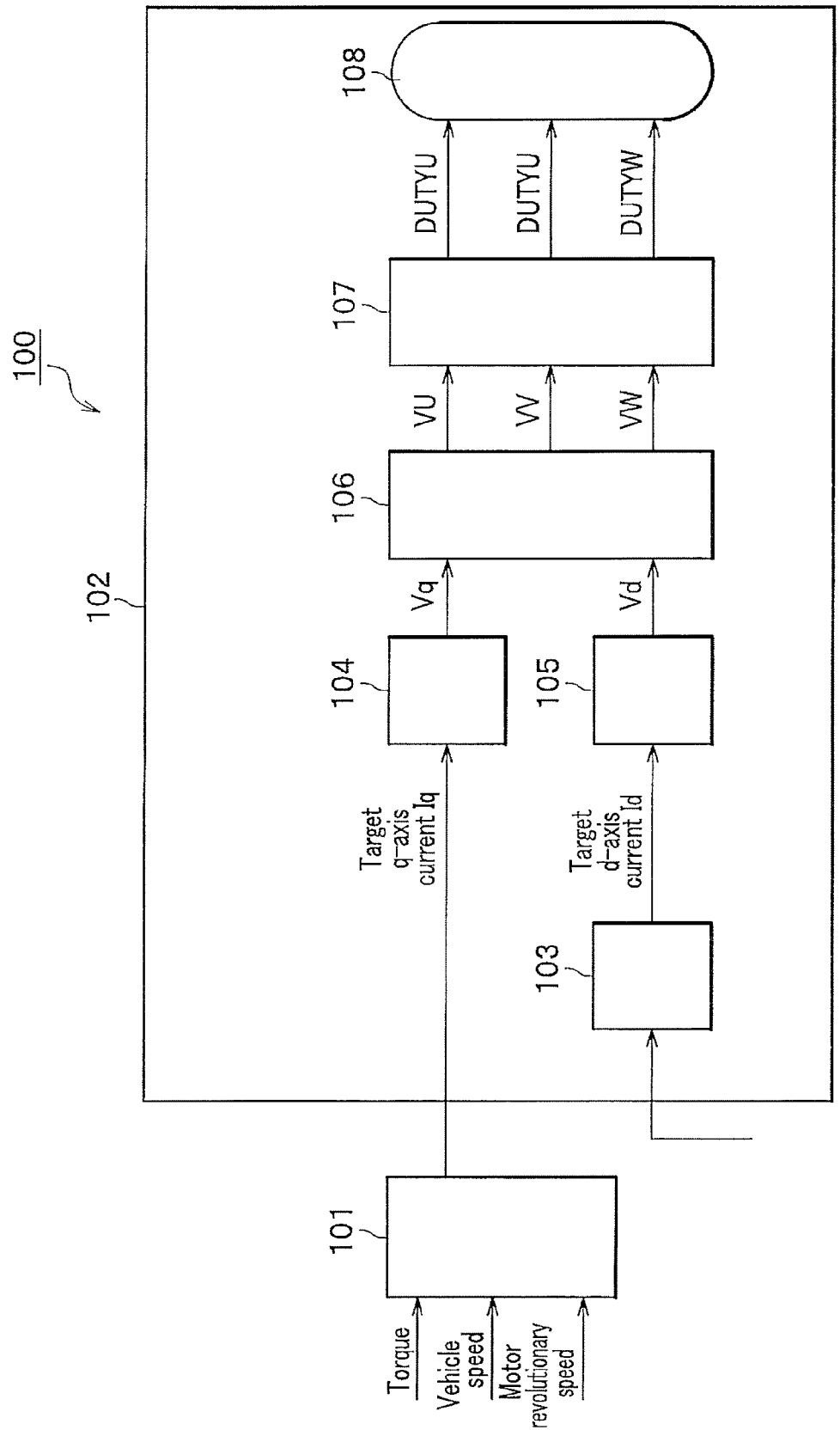
FIG. 9 is a block diagram showing a configuration of a motor control system of the electric power steering device using a brushless motor.

FIG. 9 is a block diagram showing the configuration of the motor control system of the electric power steering device using a brushless motor.

A motor control system 100 shown in FIG. 9 comprises an EPS control unit 101 and a motor control unit 102 having a field weakening control unit 103, a q-axis (the torque axis) PI control unit 104, a d-axis (the magnetic flux axis) PI control unit 105, a biaxial three-phase converting unit 106, a PWM control unit 107, and a brushless motor 108. In comparison with the motor control system 40 which is shown in FIG. 3 and which uses the synchronous reluctance motor (the motor 58), the motor control system 100 shown in FIG. 9 differs from the motor control system 40 in that the motor control system 100 has the EPS control unit 101 which directly outputs the target q-axis current to the q-axis (the torque axis) PI control unit 104 instead of the EPS control unit 41, and has the field weakening control unit 103 which performs actuation or deceleration through a resistance control and which controls a field weakening current when the motor rotates at a high speed, and the other configurations remain same in principle.

Next, regarding the operation of the motor control system shown in FIG. 9 which uses the brushless motor, an explanation will be given of differences from the operation of the motor control system shown in FIG. 3 which uses the synchronous reluctance motor.

The brushless motor 108 directly inputs a target q-axis current Iq from the EPS control unit 101 to the q-axis (the torque axis) PI control unit 104 of the motor control unit 102 because the target q-axis current Iq is proportional to the torque. On the other hand, although a target d-axis current Id is input from the field weakening control unit 103 of the motor control unit 102 to the d-axis (the magnetic flux axis) PI control unit 105, the target d-axis current Id does not affect the torque of the brushless motor 108. Accordingly, the motor control system 100 using the brushless motor 108 has the torque-current characteristic with a good linearity.

As shown in FIG. 9, according to the conventional electric power steering device, a target current (the target q-axis current in the case of the brushless motor) is directly transmitted to the q-axis (the torque axis) PI control unit 104 of the motor control unit 102 as an output parameter of the EPS control unit 101. This is possible because the current/torque characteristic of the brushless motor 108 is linear in the first order. Accordingly, even if the motor (the brushless motor 108) is changed, it is fine if the assist map of the electric power steering device is merely multiplied by a gain that cancels a change in the torque constant.

On the other hand, when the synchronous reluctance motor is changed, the torque characteristic (the torque-current characteristic) output relative to the current is nonlinear unlike a general motor with a brush and the brushless motor, so that if the output by the EPS control unit 101 is expressed as the current (the target q-axis current), the map of the EPS control unit must be changed. That is, the map of the EPS control unit 101 must be changed for each torque-current characteristic of the synchronous reluctance motor.

In order to summarize the above explanation, because a torque T1 of the brushless motor has a relationship that $T1=PN \times \phi \times Iq$, the brushless motor has the torque T1 set based on the q-axis current Iq. On the other hand, because a torque T2 of the synchronous reluctance motor has a relationship that $T2=PN \times (Ld-Lq) \times Iq \times Id$, the synchronous reluctance motor has the torque T2 set based on the q-axis current Iq and the d-axis current Id. However, P is the number of poles, $\phi$ is a magnetic flux, N is a motor revolutionary speed, Ld is an inductance on the d-axis, and Lq is an inductance on the q-axis.

Therefore, according to the synchronous reluctance motor having the nonlinear torque-current characteristic, the target current and the current advance angle are calculated using the target torque and the motor revolutionary speed. At this time, regarding the current advance angle, the advance-angle correction value is calculated for each revolutionary speed with the absolute value of the target torque being divided into three regions.

Figure 10:
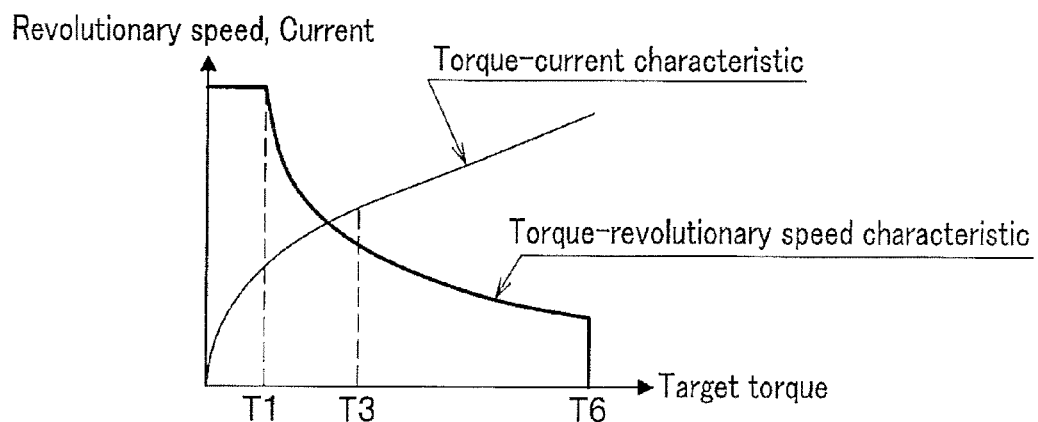
FIG. 10 is a diagram showing a torque-current characteristic of the synchronous reluctance motor and a torque-revolutionary speed characteristic thereof.

FIG. 10 is a diagram showing the torque-current characteristic of the synchronous reluctance motor and the torque-revolutionary speed characteristic thereof, the horizontal axis indicates the target torque and the vertical axis indicates the revolutionary speed and the current. That is, when the advance-angle correction value is calculated for each revolutionary speed with the absolute value of the target torque being divided into the three regions, as shown in FIG. 10, the advance-angle correction value is calculated revolutionary speed by revolutionary speed for three regions: a region (T<T1) where the absolute value of the target torque (T) is smaller than a target torque (T1) at the maximum revolutionary speed; a region (T1<T<T3) where the absolute value of the target torque (T) is present between the foregoing target torque and a target torque (T3) that is a midpoint between a nonlinear curve of the torque-current characteristic and a linear curve thereof; and a region (T3<T) where the absolute value of the target value (T) is larger than T3. However, if the advance-angle correction value is calculated through this scheme, an arithmetic process becomes complex, but by performing the torque control through the method explained in the above embodiment, the torque control with a linear characteristic can be performed through a simple arithmetic process.

DESCRIPTION OF REFERENCE NUMERALS

1 Electric power steering device
2 Steering wheel
3 Steering shaft
4 Pinion shaft
4A Pinion
5 Torque sensor
6 Torque transmitting unit
7 Electric machinery
8 Rack shaft
8A Rack tooth
9 Wheel to be steered
10 Control device
11 Speed sensor
T Steering torque signal
v Speed signal
V0 Electric-motor driving voltage
20 Stator
21 Stator main body
22 Inner circumference surface
23 Slot
23a Slot aperture
24 Teeth
30 Rotator
31 Rotator main body
32 Flux barrier (air layer)
33 Steel-plate rib
35 Synchronous reluctance motor
40, 100 Motor control system
41, 101 EPS (motor-driven power steering) control unit
42 Target-torque calculating unit
51, 102 Motor control unit
52 Target-current calculating unit
52a Maximum torque map
52b Maximum output map
53 Three-phase biaxial converting unit
54, 104 Q-axis (torque axis) PI control unit
55, 105 D-axis (magnetic flux axis) PI control unit
56, 106 Biaxial three-phase converting unit
57, 107 PWM converting unit
58 Motor (synchronous reluctance motor)
103 Field weakening control unit
108 Brushless motor

What is claimed is:

1. An electric power steering device which drives a synchronous motor based on a steering input signal from a steering input detecting unit and which assists steering, the electric power steering device comprising:
a target-torque calculating unit that calculates a target torque of the synchronous motor based on at least the steering input signal; and a target-current calculating unit that calculates a target current to the synchronous motor based on a signal from the target-torque calculating unit, wherein the target-current calculating unit includes a map having a motor-current effective value and a motor-current phase, each of which being associated with the target torque and necessary for generating the target torque, the map including at least two maps which are a normal range map and a high-output range map;

the target-current calculating unit calculates, by referring to the map and the target torque that is calculated by the target-torque calculating unit, the motor-current effective value and the motor-current phase which are associated with the target torque, and calculates a d-axis current and a q-axis current based on the motor-current effective value and the motor-current phase that have been calculated; and the synchronous motor is driven using the d-axis current and the q-axis current that have been calculated.

2. The electric power steering device according to claim 1, wherein the target-current calculating unit uses the map by changing the map from the normal range map to the high-output range map when a duty ratio of driving power output to the synchronous motor is equal to or larger than a predetermined value.

* * * * *